US010122862B2

(12) United States Patent
Tucker

(10) Patent No.: US 10,122,862 B2
(45) Date of Patent: Nov. 6, 2018

(54) SYSTEMS AND METHODS FOR CONNECTING HETEROGENEOUS NETWORKS

(75) Inventor: Douglas Tucker, San Mateo, CA (US)

(73) Assignee: UBIQUITY SOFTWARE CORPORATION LIMITED (GB)

( * ) Notice: Subject to any disclaimer, the term of this patent is extended or adjusted under 35 U.S.C. 154(b) by 2047 days.

(21) Appl. No.: 11/648,400

(22) Filed: Dec. 29, 2006

(65) Prior Publication Data

US 2017/0180560 A1 Jun. 22, 2017

(51) Int. Cl.
*H04M 7/12* (2006.01)
*H04M 3/22* (2006.01)
(Continued)

(52) U.S. Cl.
CPC ........ *H04M 7/122* (2013.01); *H04L 65/1063* (2013.01); *H04L 67/06* (2013.01); *H04L 67/28* (2013.01); *H04L 67/2838* (2013.01); *H04L 67/306* (2013.01); *H04M 3/2263* (2013.01); *H04M 7/123* (2013.01); *H04M 7/1275* (2013.01); *H04L 65/1016* (2013.01); *H04L 65/40* (2013.01); *H04L 65/403* (2013.01); *H04Q 2213/13096* (2013.01); *H04Q 2213/13098* (2013.01); *H04Q 2213/13103* (2013.01); *H04Q 2213/13196* (2013.01);
(Continued)

(58) Field of Classification Search
None
See application file for complete search history.

(56) References Cited

U.S. PATENT DOCUMENTS 6,335,927 B1 * 1/2002 Elliott et al. .................. 370/352
7,873,034 B2 1/2011 Tucker
(Continued)

FOREIGN PATENT DOCUMENTS

AU 2006201515 A1 10/2006
AU 2006201516 A1 10/2006
(Continued)

OTHER PUBLICATIONS

Harry Newton, "Newton's Telecom Dictionary", 23rd Updated and Expanded Edition, Flatiron Publishing, New York, 2007.*
(Continued)

*Primary Examiner* — Christopher M Crutchfield
*Assistant Examiner* — Thinh D Tran
(74) *Attorney, Agent, or Firm* — Stevens & Showalter, LLP

(57) ABSTRACT

The present invention comprises systems and methods for controlling a connection between and IT infrastructure and a telephony network. In one embodiment, the present invention allows such control through the use of application services adapted for use with a telephony network, a telephony application server that exposes the telephony network to the application services, and a service mediation platform controlling the interaction between the application services and the telephony application server. The service mediation server may comprise a user profile manager for handling the user profiles of a subscriber database, a service level agreement manager for invoking a set of application services, and a resource policy enforcement manager for managing the resources of the telephony network.

16 Claims, 3 Drawing Sheets

(51) Int. Cl.
*H04L 29/06* (2006.01)
*H04L 29/08* (2006.01)

(52) U.S. Cl.
CPC ............. *H04Q 2213/13204* (2013.01); *H04Q 2213/13348* (2013.01); *H04Q 2213/13389* (2013.01)

(56) References Cited

U.S. PATENT DOCUMENTS

| | | | |
|---|---|---|---|
| 8,139,752 | B2 | 3/2012 | Darby |
| 2002/0037715 | A1* | 3/2002 | Mauney ............ H04M 1/72519 455/421 |
| 2002/0126656 | A1* | 9/2002 | Park .............................. 370/352 |
| 2002/0176404 | A1* | 11/2002 | Girard ........................... 370/352 |
| 2003/0120502 | A1 | 6/2003 | Alan et al. |
| 2004/0196965 | A1 | 10/2004 | Birger et al. |
| 2005/0138032 | A1 | 6/2005 | O'Rourke et al. |
| 2005/0138183 | A1 | 6/2005 | O'Rourke et al. |
| 2005/0152344 | A1 | 7/2005 | Chiu et al. |
| 2006/0222166 | A1 | 10/2006 | Ramakrishna et al. |
| 2007/0142041 | A1* | 6/2007 | Wood ................ H04M 1/72563 455/418 |
| 2008/0144615 | A1* | 6/2008 | Casey .................. H04L 29/125 370/389 |

FOREIGN PATENT DOCUMENTS

| | | |
|---|---|---|
| CN | 1820474 A | 8/2006 |
| EP | 1473916 | 11/2004 |
| GB | 2358322 A | 7/2001 |
| WO | 2003094473 A | 11/2003 |

OTHER PUBLICATIONS

European Search Report dated Aug. 6, 2008 in counterpart European Application No. EP 07150431.

Examination Report from the European Patent Office dated Jul. 21, 2015, 6 pages.

Kasthuri M.; First Examination Report; dated Jan. 25, 2017; India Patent Application No. 3143/CHE/2007; Patent Office, Kolkata 700091, India.

He, Xijia: First Office Action; dated Jun. 22, 2011; China Patent Application No. 200710307637.5; including a translation of the text portion of the Office Action; State intellectual Property Office of the People's Republic of China.

Dominique Losseau; Communication pursuant to Article 94(3) EPC; European patent application No. 07150431.0; Feb. 1, 2018; European Patent Office; Munich, Germany.

\* cited by examiner

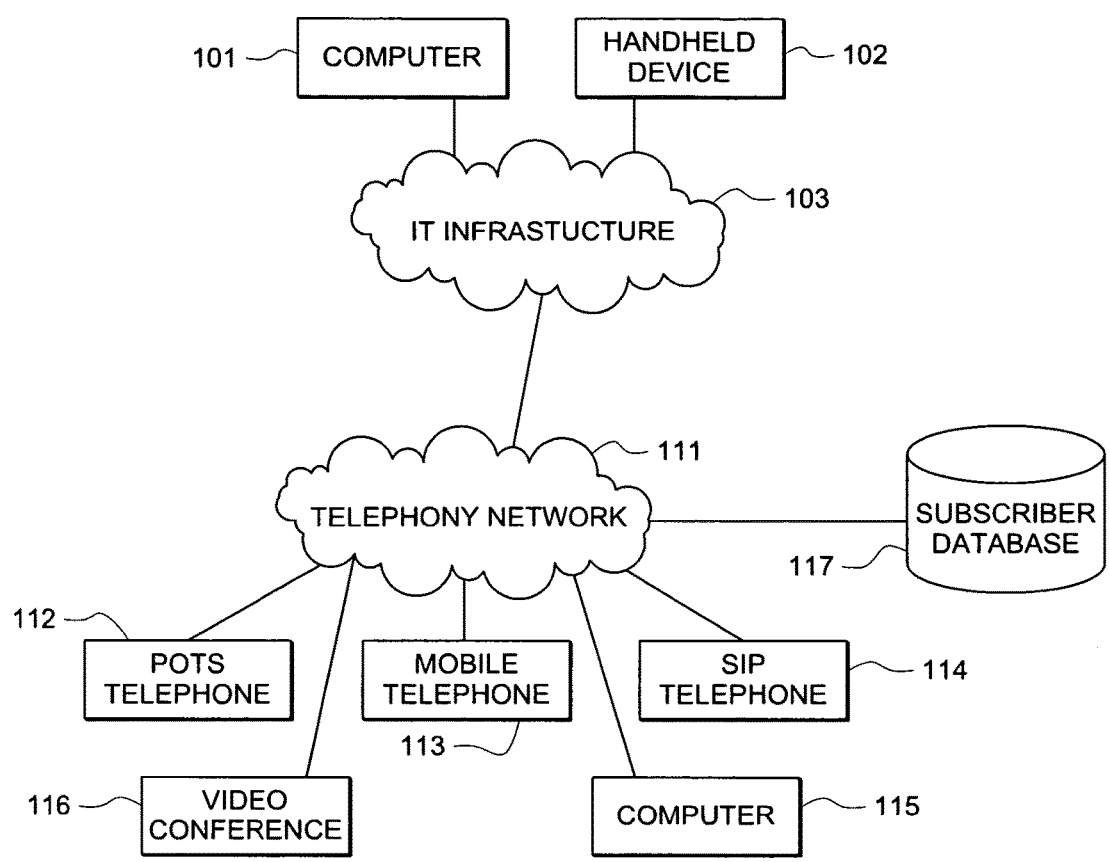

SYSTEMS AND METHODS FOR CONNECTING HETEROGENEOUS NETWORKS

CROSS-REFERENCE TO RELATED APPLICATIONS

The present application is related to co-pending and commonly assigned U.S. patent application Ser. No. 11/477,314, entitled "System and Method for Providing Feature Mediation and Orchestration on Internet Protocol Service Networks," filed Jun. 29, 2006; and co-pending and commonly assigned U.S. patent application Ser. No. 11/495,018, entitled "Voice Conference Control from an Instant Messaging Session Using an Automated Agent," filed Jul. 28, 2006, the disclosures of which are hereby incorporated herein by reference.

TECHNICAL FIELD

The invention relates generally to interfacing network infrastructure and, more particularly, to a system and method for connecting heterogeneous networks.

BACKGROUND OF THE INVENTION

FIG. 3 is a diagram showing the network of a typical telephony service provider. It illustrates the split within the carrier network today. The IT infrastructure comprises a service aggregation and deployment infrastructure that enables the rapid definition and deployment of new services as composite services to subscribers. The telephony network infrastructure is evolving toward a flexible, reliable internet protocol (IP) network and contains a network application infrastructure to implement new applications and services for subscribers. A challenge today within the carrier network is to enable both an information technology (IT) service or enterprise network (collectively referred to herein as IT infrastructure) and the telephony network to be successful while also providing the level of visibility and control necessary to take the maximum advantage of each network.

IT infrastructure provides rapid updates to existing services and introduction of totally new services based on the aggregation of telephony services (call notification, device presence, and the like), provider services (order management, billing, and the like) and third party services (music download, book price check, and the like). The IT infrastructure is the infrastructure upon which non-telephony applications (e.g., enterprise applications) run. These applications and combinations thereof are the services provided by the IT infrastructure. These services may be exposed by the IT infrastructure as web services. To the IT infrastructure, the telephony network is viewed as a web service or set of web services that provides gated access to telephony services and subscribers. The Microsoft Customer Care Framework (CCF) is an example of a platform used to create applications and services on IT infrastructure. As an example, the IT infrastructure may comprise servers and/or other computers interconnected via a network that are capable of providing services, exposing network applications as web services to other networks, and communicating with web services of other networks.

Telephony networks enhance and maintain the core network infrastructure to support network applications and telephony services while still maintaining the level of quality of service (QOS) that is expected of a telephony network. To the telephony network, the IT infrastructure provides the infrastructure necessary to provide advanced applications and services demanded by subscribers. Session Initiation Protocol (SIP) application servers are typically used by service providers to implement the services and infrastructure of their telephony network.

Spurred by the advantages of the services of IT infrastructure, providers have started including other elements of an application over and above straight telephony applications. Modern applications include call features, such as new types of find me/follow me, transfer, different ways of viewing a directory, and the like. In the new and evolving application space, the applications become much richer and multi-model, as opposed to a single aspect of audio, which would be a straight telephony application. Such new applications include: finding driving directions, enhanced buddy lists, and mixing different types of communication including text chat, email, audio and video. However, IT infrastructure and telephony networks contain fundamental differences in how issues such as security, reliability, subscriber management and authentication, and billing are handled. These fundamental differences between IT infrastructure and a telephony network leads to a hesitancy by the service provides to open up and expose their telephony networks to the IT infrastructure without an ability to control the IT infrastructure's access to the telephony network.

BRIEF SUMMARY OF THE INVENTION

The present invention comprises systems and methods for connecting heterogeneous networks, such as telephony and IT infrastructure. In one embodiment, the present invention allows such control through the use of an enterprise application server for enabling advanced services and exposing enterprise applications as web services, a telephony application server for exposing the applications of a telephony network, and a service mediation platform controlling the interaction and communication between the enterprise application server and the telephony application server. The services offered may be initiated or accessed by a user interface device including a computer, a handheld device, a POTS telephone, a mobile telephone, a SIP telephone, a SIP client, a video conferencing system, or the like. The provider of the services may test new services on a subset of the provider's subscriber database, thereupon using existing equipment for such testing of new services.

According to a further embodiment of the invention, a service mediation platform may comprise a user profile manager for centralizing the retrieval of user profiles from a subscriber database for distribution to each hosted application, a service level agreement manager for invoking a set of applications from enterprise application servers and telephony application servers to provide a service, and a resource policy enforcement manager for managing resources of a telephony network to provide services in conjunction with the service level agreement manager. The invoking of applications and managing of resources may be based in part on a user profile and/or a billing agreement between an operator and a subscriber.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3 is a diagram showing a prior art network of a typical telephony service provider.

DETAILED DESCRIPTION OF THE INVENTION

Figure 1:
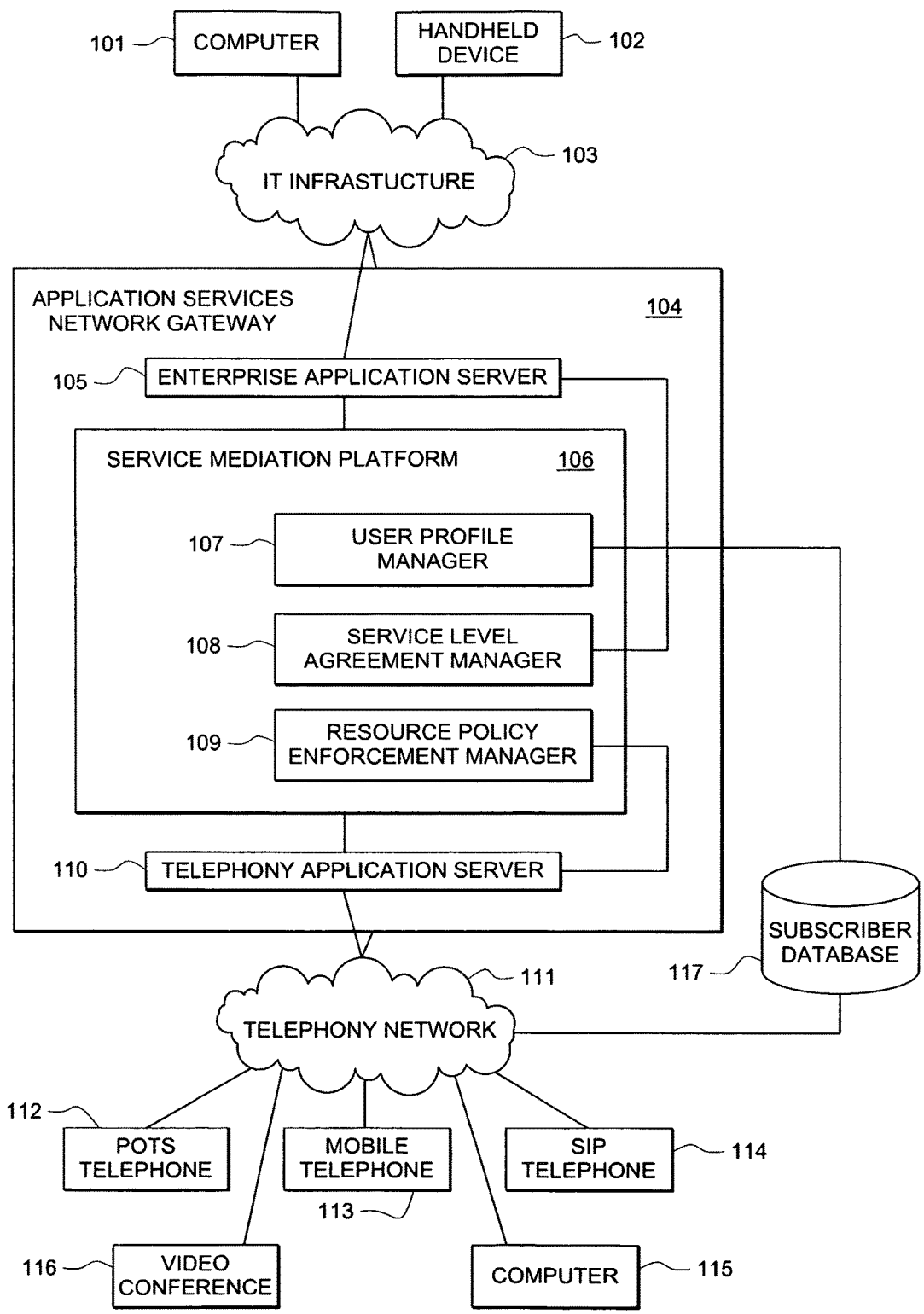
FIG. 1 is a diagram showing a network of a telephony service provider, which has been adapted according to an embodiment of the invention.

FIG. 1 is a diagram showing a network of a telephony service provider, which has been adapted according to an embodiment of the invention. Two networks (a network comprising IT infrastructure 103 and telephony network 111) of a service provider are connected to application services network gateway (ASNG) 104. The applications and services of IT infrastructure 103 may be accessed through enterprise application server 105 and, similarly, the applications and services of telephony network 111 may be accessed through telephony application server 110. IT infrastructure 103 exposes its applications and services as web services that may be incompatible with the telephony applications of telephony network 111. Further, telephony network 111 uses very strict security, subscriber management and authentication, and billing protocols and procedures, which may not be followed or properly enforced by the applications of IT infrastructure 103. ASNG 104 connects these two heterogeneous networks by exposing the applications of telephony network 111 to IT infrastructure 103 as web services and properly enforcing the protocols and procedures demanded by telephony network 111 upon the connections made. In so doing, a telephony service provider is able to provide the advanced applications and services offered by IT infrastructure 103 to its subscribers while maintaining the security and quality required of the telephony network.

Computer 101, handheld device 102, POTS telephone 112, mobile telephone 113, SIP telephone 114, computer 115, and video conference system 116 are each subscriber interface devices that are connected to IT infrastructure 103 and/or telephony network 111. A subscriber using any of such devices may request a service, with such request being handled by ASNG 104. The connection between IT infrastructure 103 and telephony network 111 allowing enterprise application server 104 to communicate with telephony application server 110 as web services is performed by ASNG 104. Further, ASNG 104 polices this connection such that the security, subscriber, and billing procedures and protocols of telephony network 111 are enforced. As such, through the use of ASNG 104 a telephony provider may offer advanced services of IT infrastructure 103 to its base of subscribers, as further detailed below.

IT infrastructure 103 is connected to Application Services Network Gateway (ASNG) 104 and hosts Application Services 105 used by ASNG 104 and Service Mediation Platform 106. IT infrastructure 103 of the illustrated embodiment provides the environment platform upon which new and old applications and services may be updated, developed, and deployed. IT infrastructure 103 may receive service requests from subscribers (e.g., through the use of computer 101 or handheld device 102). IT infrastructure 103 may further allow a subscriber to alter account settings. As an example a user may change voicemail greetings, the actions taken by an interactive voice response (IVR) session in response to user input (e.g., change the IVR menu so that when a user checks voice mail and presses the number 8, the newest message is played), or the like.

Telephony network 111 may comprise equipment hardware and software used to connect and complete a subscriber's telephone call. In the case of a mobile services provider, telephony network 111 may include the base stations, switches, and routers used to provide communication services to subscribers. Telephony network 111 may similarly be comprised of the necessary equipment for POTS or SIP networks.

ASNG 104 of the illustrated embodiment provides a bridge between IT infrastructure 103 and telephony network 111. ASNG 104 allows a provider to control which subscribers (if any) may use the applications and services hosted and deployed on IT infrastructure 103. ASNG 104 further exposes the applications and services of telephony application server 110 as web services to allow interaction and communication with the applications and services of IT infrastructure 103 (as exposed by enterprise application server 105). It is noted that the functionality of ASNG 104 may be performed by a single server or distributed over multiple servers. Further, the functionality of ASNG 104 in whole or in part, may be encoded onto a computer readable medium to be executed, wherein such medium may comprise one or a plurality of hard-disk drives, optical disc drives, random access memory, and/or the like.

Enterprise application server 105 exposes the services and applications of IT infrastructure 103 to add modern features and services to a telephony network 111. Each of the applications and services exposed by enterprise application server 105 are controlled by service mediation platform 106.

Telephony application server 110 is what exposes the applications and resources of telephony network 111 to be used by the applications of enterprise application server 105 through service mediation platform 106. Telephony application server 110 provides the basic telephony applications that are used for connecting telephone calls placed onto telephony network 111. As an example, a provider may expose its telephony applications and services through the use of a SIP application server.

Service mediation platform 106 is what facilitates the connections and communication between the applications of enterprise application server 105 and telephony application server 110. Service mediation platform 106 may be comprised of user profile manager 106, service level agreement manager 108, and resource policy enforcement manager 109. Service mediation platform 106 insulates telephony network 111 from IT infrastructure 103 and gates the access of enterprise application server 105 to telephony application server 110. Service mediation platform 106 gives the provider control over how fast changes to the applications and services of IT infrastructure 103 are rolled out to telephony network 111. As an example, an update fixing a critical security flaw of a service may be rolled out as soon as the update is ready. To the contrary, a completely new service may have a delayed rollout so that the provider may determine the overall impact on QOS. Further, such a new service may be made accessible to a subset of current subscribers so the provider may test the service on existing equipment and customers forgoing the need to set up new equipment and possibly a new customer base to test the new service.

In alternative embodiments, service mediation platform 106 may be a process within telephony application server 110, such that enterprise application server 105 would be directly connected to telephony application server 110 through the interfaces provided by service mediation platform 106. Service mediation platform 106 may also reside on a server of IT infrastructure 103.

User Profile Manager 107 is what accesses subscriber database 117 to retrieve user profile information. Decisions regarding which applications, services, and resources may be based such user profile information. As an example, a subscriber may have an account wherein conference calls are limited to three total parties. When such a subscriber attempts to initiate a conference call with more than three parties the provider may deny the request informing the user that their present account does not provide for that service. Further, the provider may give the option to the subscriber of upgrading the account to include that feature or make a fixed payment to use that feature a fixed number of times.

Service level agreement manager 108 is what determines and invokes the applications and services a subscriber may use. Decisions regarding the applications and services may be based on the user profile settings and information and also on the availability of the resources of the telephony network. As an example, if a subscriber requests through a website hosted by IT infrastructure 103 to establish a two-party call between a mobile telephone 113 and a phone of a second party, telephony network 111 may not have enough capacity or mobile phone 113 may not have enough signal strength to complete the call. Service level agreement manager 108 works in conjunction with resource policy enforcement manager 109 in dealing with telephony network resource issues.

Resource Policy Enforcement Manager 109 is what determines the resource availability of and controls access to telephony network 111 through telephony application server 110. If resource policy enforcement manager 109 determines resources requested by service level agreement manager 108 are unavailable, then resource policy enforcement manager 109 may disallow access to telephony application server 110 and telephony network 111. In such an event, the subscriber may be informed that their request cannot be completed and may be given alternative options for how next to proceed. Furthering the previous example of a subscriber requesting a two party call, a provider may inform the subscriber of the inability perform the request and suggest alternatives such as using a SIP telephone or text chat instead of mobile telephone 113.

Subscriber database 117 is what a provider may use to store various user profiles and settings thereof, which may be used by service mediation platform 106 to control and personalize the applications and services used by a subscriber. Subscriber database 117 may be similar to or an extension of a Home Subscriber Server (HSS) as implemented in an IP Multimedia Subsystem (IMS). The information stored within subscriber database 117 may be used to determine which IVR voice prompts are given to one or a group of subscribers. As an example, subscribers that have indicated Spanish (or any other language supported by the IVR system) as being the preferred language may hear the IVR voice prompts in Spanish. Further, a subscriber may choose to additionally or alternatively record their own IVR voice prompts.

POTS telephone 112, mobile telephone 113, SIP telephone 114, computer 115, and video conferencing system 116 are subscriber interface devices used for communication (e.g., phone calls, video conferencing, and the like). Each of devices 112-116 are connected to an appropriate network and may also be used to manage account settings or request various services. As an example, a subscriber using mobile telephone 113 may call a provider's IVR system to record a new voicemail greeting. Additionally, a subscriber using SIP telephone 114 may elect to order a ringtone and have it downloaded to their own or a friends mobile telephone. It is noted that a SIP client may be used via any number of devices, with such devices including: dedicated hardware devices (e.g., SIP telephone 114); general purpose computing devices (e.g., a computer running SIP client 115); video conferencing systems (such as element 116); and the like. Additionally, video conferencing system 116 may be based on any video conferencing protocol, including: SIP, H.323, and the like.

Computer 101 and handheld device 102 are user interface devices connected to IT infrastructure 103. Computer 101 and handheld device 102 may be used by a user to request and utilize various services offered by a provider. Computer 101 may be connected to IT infrastructure 103 through the Internet, a corporate intranet, or the like, via any means of a wired or wireless network, whereupon a user may log into a website hosted by or that has an agreement with the user's provider. As an example, a user may log into their Yahoo! account and click on an item in their buddy list to initiate a voice call between the user and the entity identified by the item clicked on of the buddy list. Similarly, handheld device 102 may be connected to IT infrastructure 103 through the Internet and access websites that may be tailored to the physical characteristics of Handheld device 102 for using the same provider services as those available to computer 101. A further example, buddy list conferencing, may have a subscriber who is already engaged in voice call, request another party be conferenced in, with such request being made with either computer 101 or handheld device 102 accessing the subscriber's Yahoo! buddy list. In yet another example, the systems and methods of co-pending U.S. application Ser. No. 11/495,018 may be employed to control video conferences via an instant messaging session.

It is noted that while IT infrastructure 103 and telephony network 111 are shown as logically separate networks in FIG. 1, these networks and/or the elements making up these networks may be physically interconnected (e.g., the telephony and enterprise servers are all interconnected via switches and/or routers). Additional or alternative embodiments of the invention may have telephony network 111 physically comprise IT infrastructure 103 or vice versa. It is also noted that additional or alternative embodiments may have SIP clients (e.g., elements 114-115) connect through IT infrastructure 103 in addition to or instead of through telephony network 111.

Figure 2:
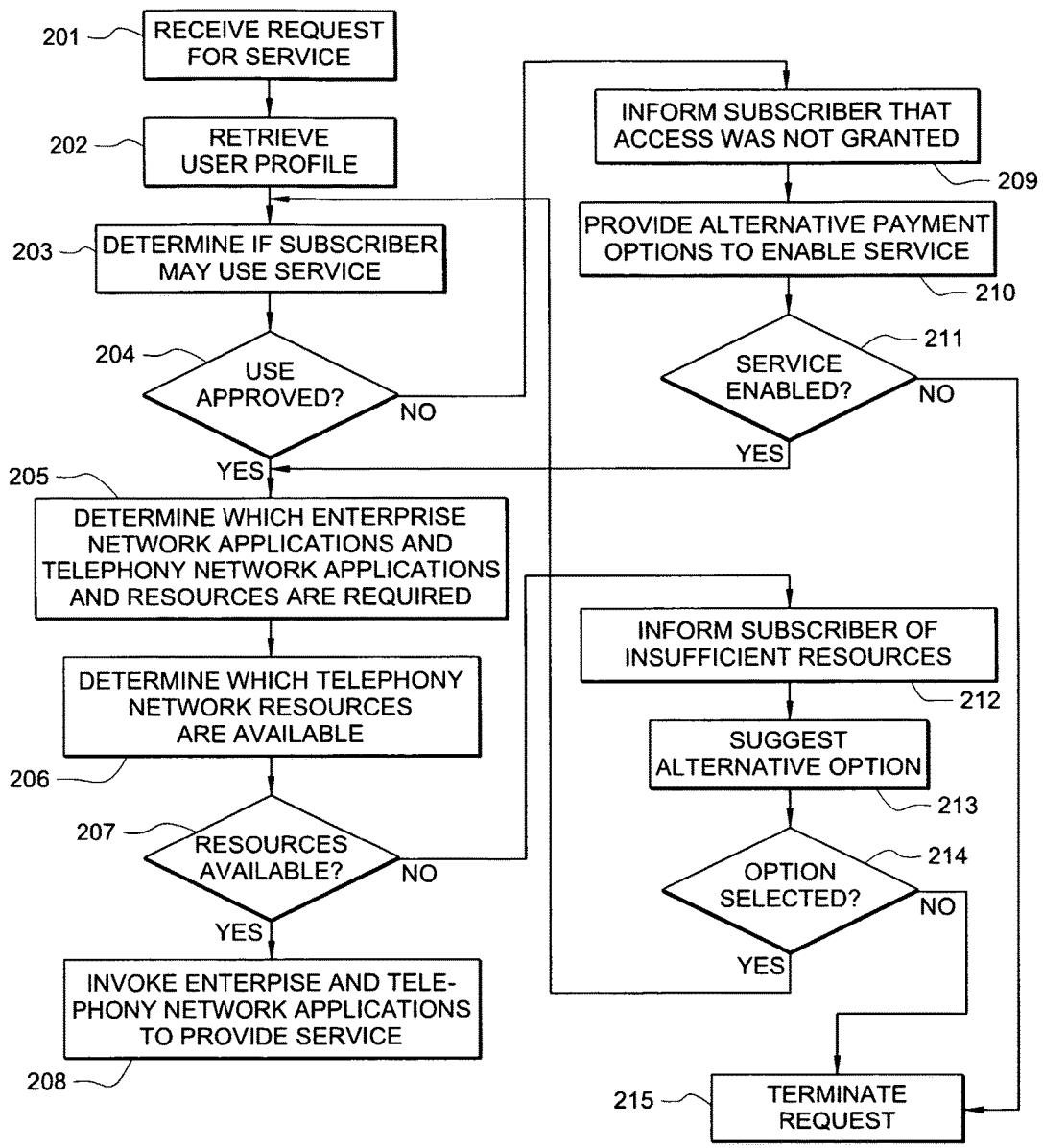
FIG. 2 is a flow chart showing steps for providing applications and services using a provider's network according to an embodiment of the invention.

FIG. 2 is a flow chart showing steps for providing applications and services using a provider's network according to an embodiment of the invention. Block 201 shows the method receiving a request for service from a subscriber by ASNG 104. Such a request may be received by a provider either through IT infrastructure 103 (e.g., the subscriber uses a computer or handheld device connected through the Internet to the IT infrastructure) or telephony network 111 (e.g., through the use of interface devices 112-116). As an example, a subscriber may request to have calls forwarded to specific numbers at different times of the day (hereinafter, clocked call forwarding).

Block 202 shows user profile manager 107 retrieving a user profile associated with the subscriber who initiated the request from subscriber database 117. Such a user profile may include: account information, user preferences, billing information, and the like. The user profile is retrieved so that systems adapted according to the invention may make intelligent decisions regarding access to services. For clocked call forwarding, the provider may charge an extra fee for such service and whether or not the subscriber has paid the fee may be noted in the billing and/or account information portions of the user profile.

Block 203 shows service level agreement manager 108 determining if a subscriber my access the service requested in block 201. User profile information may be used in such a determination. Service level agreement (SLA) manager 108 may check the account and billing information of the subscriber within the subscriber's user profile to determine if the subscriber is allowed to use the requested service. SLA manager 108 may additionally be enabled to change the operation of the selected service based on the profile retrieved. In the example of clocked call forwarding, the system may make the determination based in part on whether the subscriber had paid the fee for the service.

Diamond 204 shows the method branching on whether the use of a particular service is approved by service level agreement manager 108. If approved, the method may proceed to block 205. If, however, the use of the particular service is not approved, the method may proceed to block 209, wherein service level agreement manager 108 may inform the subscriber requesting the service that the request for use was not granted. In the example of clocked call forwarding, the provider may communicate this decision through the use of an IVR message to subscribers access which access the system by telephone.

Block 210 shows the service level agreement manager 108 providing alternative payment options to enable the subscriber to use the service. As an example, a provider may wish to allow a subscriber to pay for services on demand. In such cases, the provider allow the subscriber to make billing arrangements as soon as an attempt to use a service is encountered. With the clocked call forwarding example, the subscriber may follow the instructions of a series of IVR prompts to make billing arrangements, which may further allow the subscriber to use various forms of payment methods, including: credit or debit cards, an electronic check over the telephone, wire money transfer, and the like.

Diamond 211 shows the method branching on whether the service has been enabled (e.g., the subscriber paid for the service with a credit card). If the service has been enabled, the method may proceed to block 205. If, however, the service has not been enabled, the method may proceed to block 215, wherein the request for service is terminated without the subscriber having used the service.

Block 205 shows service level agreement manager 108 determining which IT infrastructure applications and telephony network applications are required to implement the requested service. For clocked call forwarding, a system embodying the invention may determine that a telephony application for recognizing an incoming call and an enterprise application for routing the call to the appropriate subscriber selected number may be required to implement the service. Such a system may further determine that one of the numbers for calls to be forwarded to is a part of the subscribers network.

Block 206 shows resource policy enforcement manager 109 determining which telephony network resources are available. For clocked call forwarding, the system may determine the status and availability of the numbers to which calls are to be forwarded.

Diamond 207 shows the method branching on whether the required telephony network resources are available. If the resources are available, the method may proceed to block 208, otherwise the method may proceed to block 212.

Block 212 shows the service level agreement manager 108 informing the subscriber that insufficient resources are available, based on the determination of resource policy enforcement manager 109. With the clocked call forwarding example, a system may have determined that the number to which calls are to be forwarded cannot or will not accept such forwarded calls. In this case, the system may inform the subscriber of the lack of resource available.

Block 213 shows the service level agreement manager 108 suggesting an alternative option or options to the subscriber. A system in accordance with the invention may be programmed to offer a set of similar services to the subscriber in the event that that there insufficient telephony network resources available. As an example, the number to which the calls are to be forwarded may refuse to allow such activity. In this case, the system may suggest alternative numbers to which calls may be forwarded. The options presented to the user may be based on many things including options for changing the settings of the service requested to suggesting entirely different services.

Diamond 214 shows the method branching on whether and alternative option was selected. If an alternative option was selected, the method may proceed to block 203, otherwise the method may proceed to block 215, terminating the request.

Block 208 shows service level agreement manager 108 invoking the proper enterprise and telephony applications to provide the service. In the example of clocked call forwarding a system embodying the invention may determine that the necessary resources are available (e.g., the line to calls are to be forwarded has the ability to accept such forwarded calls) and assign the resources appropriately.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for coupling and bridging a telephony network and information technology (IT) infrastructure which is separate from said telephony network, said system comprising:
   an application server of said IT infrastructure hosting an enterprise application exposed as a web service to a network of said IT infrastructure;
   a telephony application server hosting a telephony application; and
   a service mediation platform that:
   exposes said telephony applications as a web service; and
   controls connections between said enterprise application of said application server and said telephony application of said telephony application server based on protocols of said telephony network by:
      receiving a selection of a requested service;
      determining which of the exposed IT infrastructure applications are required to perform the requested service;
      determining which of the exposed telephony applications are required to perform the requested service;
      determining if the required IT infrastructure applications are available;
      determining if the required telephony applications are available;
      implementing the requested service if the required telephony applications and required IT infrastructure applications are available;
      disallowing the requested service if the required telephony applications and required IT infrastructure applications are not available; and
      suggesting an alternative to the requested service if the required telephony applications and required IT infrastructure applications are not available, and the requested service is disallowed, wherein the suggested alternative to the requested service includes options for changing the settings of the service requested to suggesting entirely different services.

2. The system of claim 1 further comprising a user interface device for issuing requests for at least one service exposed as said web service provided by said telephony application.

3. The system of claim 2, wherein said user interface device comprises a user interface device selected from the group consisting of: a computer, a portable handheld device, a plain old telephone system (POTS) telephone, a mobile telephone, session initiation protocol (SIP) client, or a video conferencing system.

4. The system of claim 1, wherein services controlled by said service mediation platform comprise a service selected from the group consisting of:
   a personal call request, a conference call request, a call forwarding request, an account settings change request, a ringtone download request, a music download request, a picture download request, a video download request, a ringtone upload request, a music upload request, a picture upload request, and a video upload request.

5. The system of claim 1, wherein said service mediation platform invokes said enterprise application of said enterprise application server and said telephony application of said telephony application server to provide a particular service to a subscriber.

6. The system of claim 1, wherein said service mediation platform manages resources of said telephony network to provide a service to a subscriber based in part on a billing agreement between a subscriber and an operator providing said services to said subscriber.

7. A non-transitory computer readable medium embodied with a computer program comprising computer executable instructions, the computer executable instructions comprising:
   an application server of an information technology (IT) infrastructure hosting an enterprise application exposed as a web service to a network of said IT infrastructure;
   a telephony application server hosting a telephony application; and
   a service mediation platform exposing said telephony applications as a web service comprising:
      a user profile manager for retrieving user profiles from a subscriber database of the telephony network;
      a service level agreement manager that facilitates the provision of services by invoking a set of application services of the IT infrastructure and making information retrieved from said user profiles available to said application services of the IT infrastructure; and
      a resource policy enforcement manager for managing resources of said telephony network in conjunction with said service level agreement manager based at least in part on said user profiles;
   wherein the service mediation platform controls connections between said enterprise application of said application server and said telephony application of said telephony application server based on protocols of said telephony network by:
      receiving a selection of a requested service;
      determining which of the exposed IT infrastructure applications are required to perform the requested service;
      determining which of the exposed telephony applications are required to perform the requested service;
      determining if the required IT infrastructure applications are available;
      determining if the required telephony applications are available;
      implementing the requested service if the required telephony applications and required IT infrastructure applications are available;
      disallowing the requested service if the required telephony applications and required IT infrastructure applications are not available; and
      suggesting an alternative to the requested service if the required telephony applications and required IT infrastructure applications are not available, and the requested service is disallowed, wherein the suggested alternative to the requested service includes options for changing the settings of the service requested to suggesting entirely different services.

8. The product of claim 7, wherein said invoking is based in part on said user profiles.

9. The product of claim 7, wherein said managing resources of said telephony network is further based in part on a billing agreement between a subscriber and an operator providing said services to said subscriber.

10. The product of claim 7, wherein said services facilitated by said service level agreement manager are selected from the group of services consisting of:
   a personal call service, a conference call service, a video call service, a video conferencing call service, a call forwarding service, an account setting change service, a ringtone download service, a music download service, a picture download service, a video download service, a ringtone upload service, a music upload service, a picture upload service, or a video upload service.

11. A method for providing services to a provider's network, said method comprising:
retrieving a user profile from a subscriber database of a telephony network invoking a set of application services of an information technology (IT) infrastructure network, wherein said application services are exposed as a web service;
managing resources of said telephony network based in part on said invoking said IT infrastructure network application services and said user profile, wherein said service comprises a new service being testing, and, wherein a subset of subscribers from said subscriber database are allowed to perform a request for said service; and
controlling connections between the telephony network and the IT infrastructure network by:
receiving a selection of a requested service;
determining which of the exposed IT infrastructure applications are required to perform the requested service;
determining which of the exposed telephony applications are required to perform the requested service;
determining if the required IT infrastructure applications are available;
determining if the required telephony applications are available;
implementing the requested service if the required telephony applications and required IT infrastructure applications are available;
disallowing the requested service if the required telephony applications and required IT infrastructure applications are not available; and
suggesting an alternative to the requested service if the required telephony applications and required IT infrastructure applications are not available, and the requested service is disallowed, wherein the suggested alternative to the requested service includes options for changing the settings of the service requested to suggesting entirely different services.

12. The method of claim 11, wherein said invoking is based in part on said user profile.

13. The method of claim 11, wherein said managing is further based in part on an availability of resources of said telephony network.

14. The method of claim 11, wherein said managing is further based in part on a billing agreement between an operator providing said service to a subscriber and said subscriber.

15. The method of claim 11 further comprising receiving a request for a service from a user, wherein said user is using a device selected from the group consisting of: a computer connected to said UIT infrastructure network, a plain old telephone service (POTS) telephone connected to said telephony network, a session initiation protocol (SIP) device connected to said telephony network, and a mobile telephone connected to said telephony network.

16. The method of claim 15, wherein said service may be any of: a personal call service, a conference call service, a call forwarding service, an account settings change service, a ringtone download service, a music download service, a picture download service, a video download service, a ringtone upload service, a music upload service, a picture upload service, or a video upload service.

* * * * *

UNITED STATES PATENT AND TRADEMARK OFFICE
CERTIFICATE OF CORRECTION

PATENT NO. : 10,122,862 B2  
APPLICATION NO. : 11/648400  
DATED : November 6, 2018  
INVENTOR(S) : Douglas Tucker It is certified that error appears in the above-identified patent and that said Letters Patent is hereby corrected as shown below:

On the Title Page

Column 2, item (57) Abstract, Line 2, "controlling a connection between and IT infrastructure and" should read --controlling a connection between an IT infrastructure and--

Signed and Sealed this  
Sixth Day of August, 2019

Andrei Iancu  
*Director of the United States Patent and Trademark Office*